United States Patent [19]

Coash

[11] Patent Number: 4,737,771

[45] Date of Patent: Apr. 12, 1988

[54] SECURITY SYSTEM WITH INTERFERENCE DETECTION

[75] Inventor: Ronald J. Coash, Lincoln, Nebr.

[73] Assignee: Emhart Industries, Inc., Indianapolis, Ind.

[21] Appl. No.: 888,495

[22] Filed: Jul. 23, 1986

[51] Int. Cl.[4] .......................... G08B 1/08; H04Q 7/00

[52] U.S. Cl. .................................... 340/539; 340/536; 455/1; 455/67; 455/63; 375/99; 342/14

[58] Field of Search ............... 340/539, 501, 500, 506, 340/531, 536; 455/1, 67, 222, 224, 154, 155, 158, 63; 342/14, 20; 324/57 N; 375/26, 99

[56] References Cited

U.S. PATENT DOCUMENTS

| | | | |
|---|---|---|---|
| 3,431,496 | 3/1969 | O'Donnell | 455/1 |
| 4,357,709 | 11/1982 | Butler et al. | 455/1 |
| 4,434,506 | 2/1984 | Fujiwara et al. | 455/67 |
| 4,524,446 | 6/1985 | Sun et al. | 455/67 |

*Primary Examiner*—Donnie L. Crosland

*Attorney, Agent, or Firm*—Carl A. Forest

[57] ABSTRACT

A security system having one or more sending units for transmitting an electromagnetic signal representative of a condition such as fire, smoke, intrusion, battery condition, an emergency or other condition to a central receiving unit. Upon reception of an electromagnetic signal, the receiving unit provides an electromagnetic carrier detect signal to a microprocessor. A software timer within the microprocessor keeps track of the time over which the carrier is detected. If the carrier detection continues for a time longer than about 20 seconds, then a jamming indication signal is provided to one or more outputs. While the system is being jammed, alarms are ignored thus avoiding false alarms due to interference.

6 Claims, 6 Drawing Sheets

SECURITY SYSTEM WITH INTERFERENCE DETECTION

BACKGROUND OF THE INVENTION

1. Field of the Invention

The Invention in general relates to security systems and in particular a wireless security system having one or more detector/sending units for reporting the existence of a condition to a central receiving unit.

2. Description of the Prior Art

Security systems which include one or more sending units which transmit coded radio frequency (r-f) signals to a central receiving unit which decodes the signals to produce an alarm or other indication of a condition at the sending unit location are well known. The condition may be the existence of a fire, an intrusion, an emergency, the presence of water or other fluid, or other condition desired to be monitored. Or the condition may be the status of the sending unit, such as the condition of its battery or other sensor status. Generally, the information sent will also include the identity or location of the sending unit. The term "security system" as used herein is intended to include any such system that sounds an alarm or reports on one or more conditions.

A problem with r-f or wireless security systems is that electrical interference may disturb or disrupt the transmission of data. Such disruption or disturbance is often referred to as "jamming". Insofar as known to me, no prior art security system includes a means for detecting jamming. Since jamming may be intentional, in order to subvert the system, and even when it is not intentional it may indicate a serious problem with the system, it would be highly desirable to have a means for detecting jamming in a security system. Moreover, in the prior art systems interference often causes false alarms, which have been a hindrance to the acceptance of security systems by the public. Thus a security system that can detect interference and disregard false alarms while the interference is occurring would be a significant advance in the art of security systems.

SUMMARY OF THE INVENTION

It is an object of the invention to provide a security system that is able to detect interference or jamming.

It is a further object of the invention to provide a security system that can discriminate between jamming and other problems with the system.

It is another object of the invention to provide a security system which provides an indication of when jamming is occurring.

It is still another object of the invention to provide a security system that provides a record of when jamming has occurred.

The invention provides a security system comprising: sensor means for sensing a condition and producing a data signal representative of the condition; transmitter means for transmitting an electromagnetic signal modulated by the data signal; receiver means for receiving the electromagnetic signal and for providing a received data signal; interference detection means for detecting interference with the electromagnetic signal and for producing a control signal; and output means responsive to the received data signal and the control signal for providing an indication of the sensed condition. Preferably the security system includes a means for providing an indication that interference with the electromagnetic signal is occurring. Preferably the interference detection means comprises a means for determining that a signal has been received by said receiver continuously for a predetermined time. Preferably the interference detection means includes a means for providing a carrier detect signal indicative that an electromagnetic wave is being received by said receiver, a timing means for producing a timing signal and a means responsive to the carrier detect signal and the timing signal for producing the control signal.

Numerous other features, objects and advantages of the invention will become apparent from the following detailed description when read in conjunction with the accompanying drawings.

DESCRIPTION OF THE PREFERRED EMBODIMENT

Figure 1:
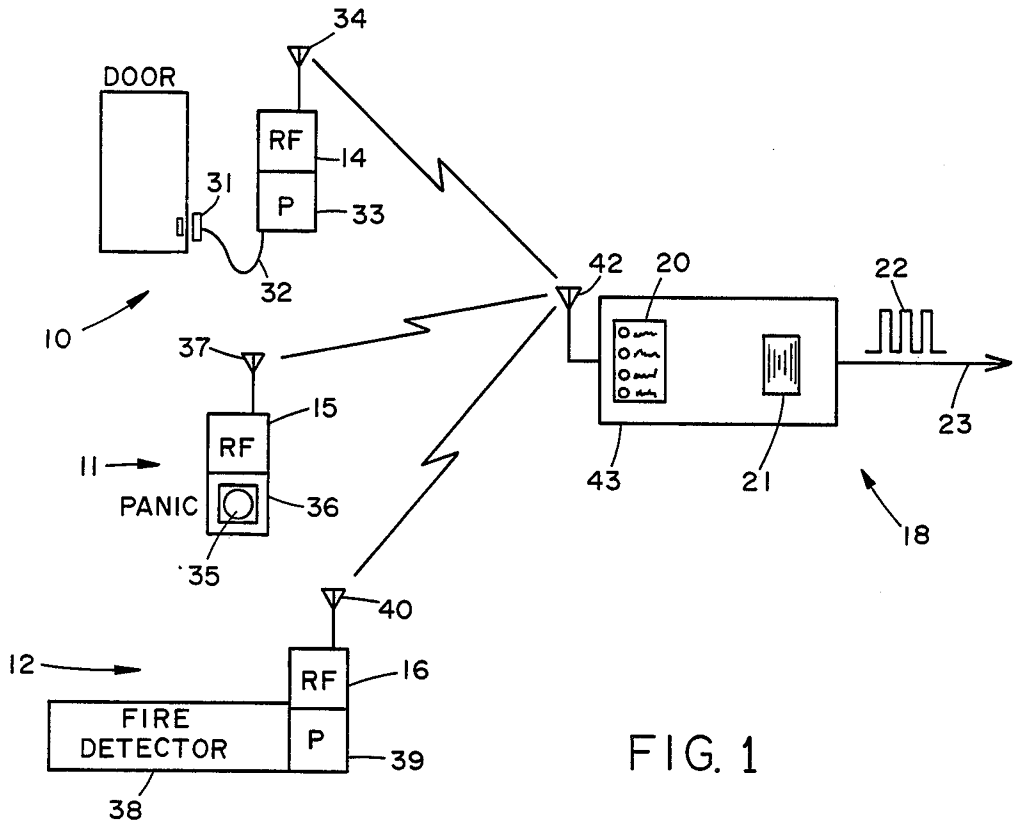
FIG. 1 is a schematic illustration of an exemplary security system according to the invention.

Directing attention to FIG. 1, an exemplary embodiment of the security system according to the invention is shown. This embodiment includes three remote sending units 10, 11 and 12 and a central receiving unit 18. The sending units include an intrusion detector 10 on a door, a panic button unit 11, and fire detector unit 12, each of which produces a data signal when the particular condition they are designed to detect occurs. Each remote detector unit 10, 11 and 12 has a radio frequency (r-f) transmitter 14, 15 and 16 respectively, associated with it which transmits a modulated r-f signal which is received by the central unit 18. The central unit 18 demodulates the signals and provides outputs, such as flashing lights 20, a buzzer 21, or a signal 22 over a telephone line 23 to a supervising station (not shown), which indicates the conditions detected. The central unit 18 also checks whether the signal is being interfered with and if it is, provides an indication (a light, a buzzer or a signal on the telephone line, for example) that the signal is being jammed.

Turning now to a more detailed description of the invention, the preferred embodiment of the detection system shown in FIG. 1 includes an intrusion detector unit 10, a panic button unit 11 and a fire detector unit 12. It is understood that the three remote units shown are exemplary. An embodiment may have two such remote units or it may have hundreds. Other types of detectors than intrusion, panic and fire may also be included. For example, detectors which signal the presence of water where it should not be, or other unsafe or undesirable conditions may be included. Or the system may include only one type of detector, such as a fire alarm. Remote unit 10 includes a magnetic contact device 31 on a door which is connected via wire 32 to a signal processing circuit 33. The processing circuit 33 is connected to r-f transmitter 14 which transmits a signal to central unit 18 via antenna 34. Similarly, panic unit 11 comprises a panic button 35 which is connected to signal processing circuit 36, which is connected to transmitter 15, having antenna 37, and fire unit 12 comprises fire detector 38 which is connected to signal processor 39, which is connected to transmitter 16, having antenna 40. Central unit 18 includes antenna 42 which is connected to a receiver 88 (FIG. 3) and signal processing circuitry within the chassis 43 of central unit 18. The signal processing circuitry is connected to annunciator lights 20, buzzer 21, and a telephone line 23. Other inputs and outputs shall be discussed in reference to FIG. 3. It should be understood that the inputs and outputs are exemplary. In some embodiments, a variety of others may be used. It is also understood that a wide variety of other signals, such as battery status signals, supervision signals, etc. may be transmitted between remote units 10, 11 and 12 and central unit 18.

Figure 2:
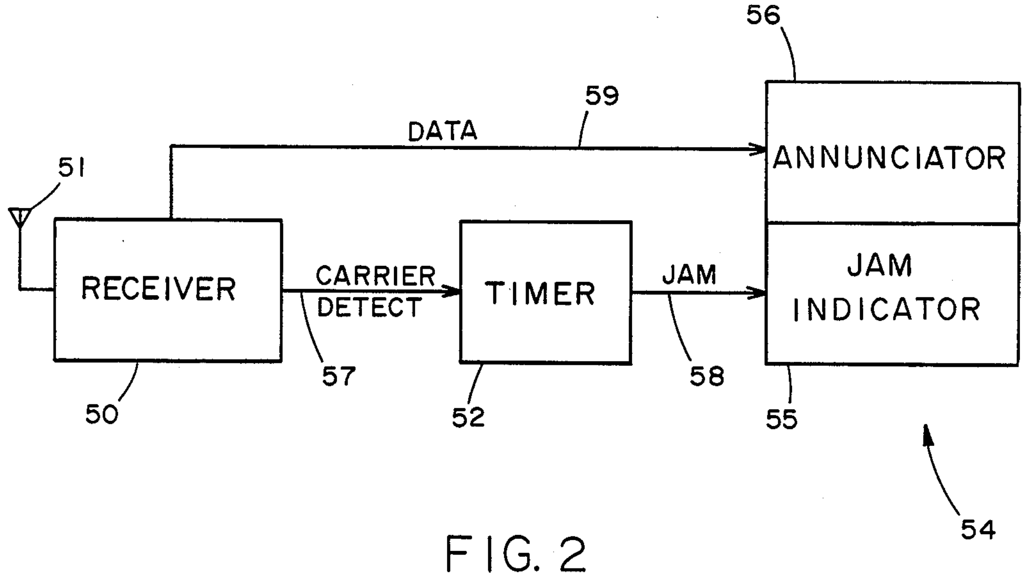
FIG. 2 is a block diagram of one embodiment of a receiving unit according to the invention.

One embodiment of a receiving unit 18 is shown in FIG. 2. The unit includes a receiver 50 having an antenna 51, a timer 52, and an output means 54 which includes a jamming indicator 55 and an annunciator 56. Receiver 50 provides a carrier detect signal on line 57 and a data signal on line 59 whenever an electromagnetic carrier wave is being detected. In this embodiment a low signal on line 57 indicates that the carrier is being received. The low signal on line 57 activates timer 52. The preferred embodiment of the transmitter, such as 16 in FIG. 1, normally completes a transmission in 18 milliseconds. Thus, if carrier is detected for a period longer than 18 milliseconds, jamming may be occurring. Timer 52 is designed to place a control signal on line 58 when it times out at a predetermined time, which is longer than 18 milliseconds. The control signal on line 58 activates jamming indicator 55. In order to ensure that the excessive length of the transmission time is not due to overlap in transmission between transmitters or other such occurrences that can commonly extend the time over which an electromagnetic carrier signal is being received, the predetermined time is set to 20 seconds in the embodiment of FIG. 2. Jamming indicator 55 is preferably a jamming indicator light, but may be an audible alarm or any other indicator also. Timer 52 is a delay timer as may be purchased from an electrical supply store. Receiver 50 may be any conventional receiver having a carrier detect output, but is preferably the receiver shown in FIGS. 4A, 4B and 4C and described below. Annunciator 56 is preferably a set of annunciator lights with appropriate legends but may be any other form of data output device.

Figure 3:
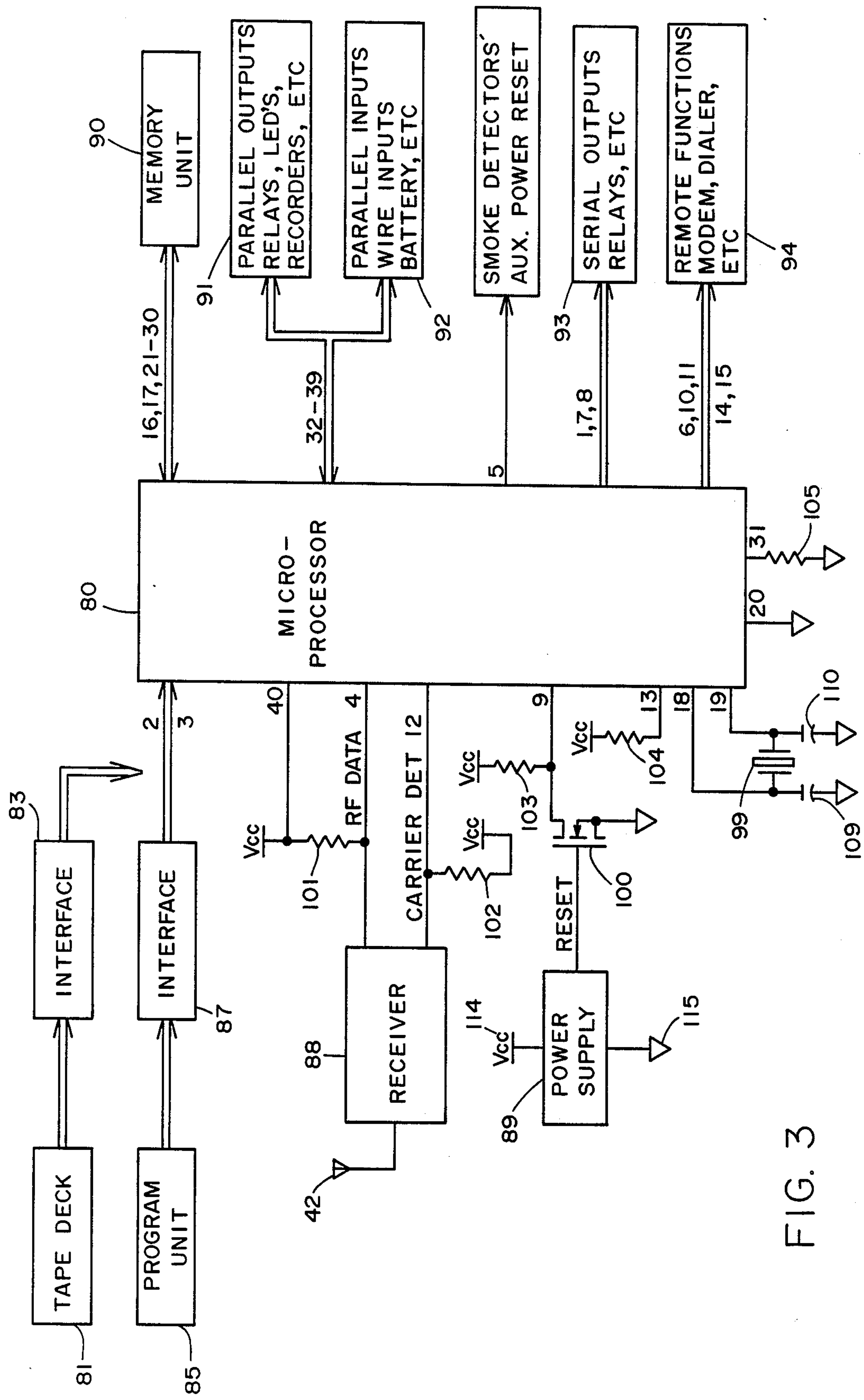
FIG. 3 is a semi-block diagram of the preferred embodiment of a receiving unit according to the invention.

A semi-block diagram of the preferred receiving unit 18 according to the invention is shown in FIG. 3. In this drawing, and in FIGS. 4A, 4B and 4C, the numbers on the lines into an integrated circuit element, such as the 2 and 3 on the interface line at the upper left side of Microprocessor 80, refer to the pin numbers of the integrated circuit element. The components of central unit 18 as shown in FIG. 3 include tape deck 81, interface 83, programming unit 85, interface 87, receiver 88, power supply 89, memory 90, parallel outputs 91, parallel inputs 92, serial outputs 93, remote functions 94, oscillator 99, transistor 100, resistors 101 through 105 and capacitors 109 and 110. The number 2 and 3 pins of microprocessor 80 are connected to the programming inputs of the central unit 18. Programming unit 85 may be connected to these pins through an interface 87 or alternatively tape deck 81 may be connected through its interface 83. These components, 85 and 87 or 81 and 83, generally are connected only during the programming of the unit 18. The number 40 pin of microprocessor 80 is connected to the Vcc system voltage source and to the data output of receiver 88 through resistor 101. The data output of receiver 88 is also connected to pin 4 of the microprocessor. Pin 12 is connected to the carrier detect output of receiver 88 and to the Vcc voltage through resistor 102. The number 9 pin is connected to the drain of transistor 100 and to the Vcc voltage through resistor 103. The source of transistor 100 is connected to ground and the gate is connected to the reset output of the power supply 89. The power supply 89 provides the Vcc voltage 114 and a ground 115 for the system. The number 13 pin is connected to the Vcc voltage through resistor 104. The number 18 pin of microprocessor 80 is connected to the number 19 pin through oscillator 99 and to ground through capacitor 109. The number 19 pin is also connected to ground through capacitor 110. The number 20 pin is grounded and the number 31 pin is connected to ground through resistor 105. The number 6, 10, 11, 14 and 15 pins are connected to various remote functions, such as a modem, dialer, etc. These functions include the telephone line 23 (FIG. 1). Pins 1, 7 and 8 are connected to the serial outputs which may include relays and other devices. The number 5 pin is connected to the reset input of the smoke detector auxiliary power circuit. The number 32–39 pins provide the parallel input/output function and are connected to both the parallel outputs, such relays, LED's 20 and buzzer 21 and to the parallel inputs, which may include hardwired inputs to various sensors (providing a hardwire option for the system) and to various status inputs such as the battery and the memory unit. The number 16, 17, and 21–30 pins are connected to the central memory unit 90.

Figures 4, 4A:
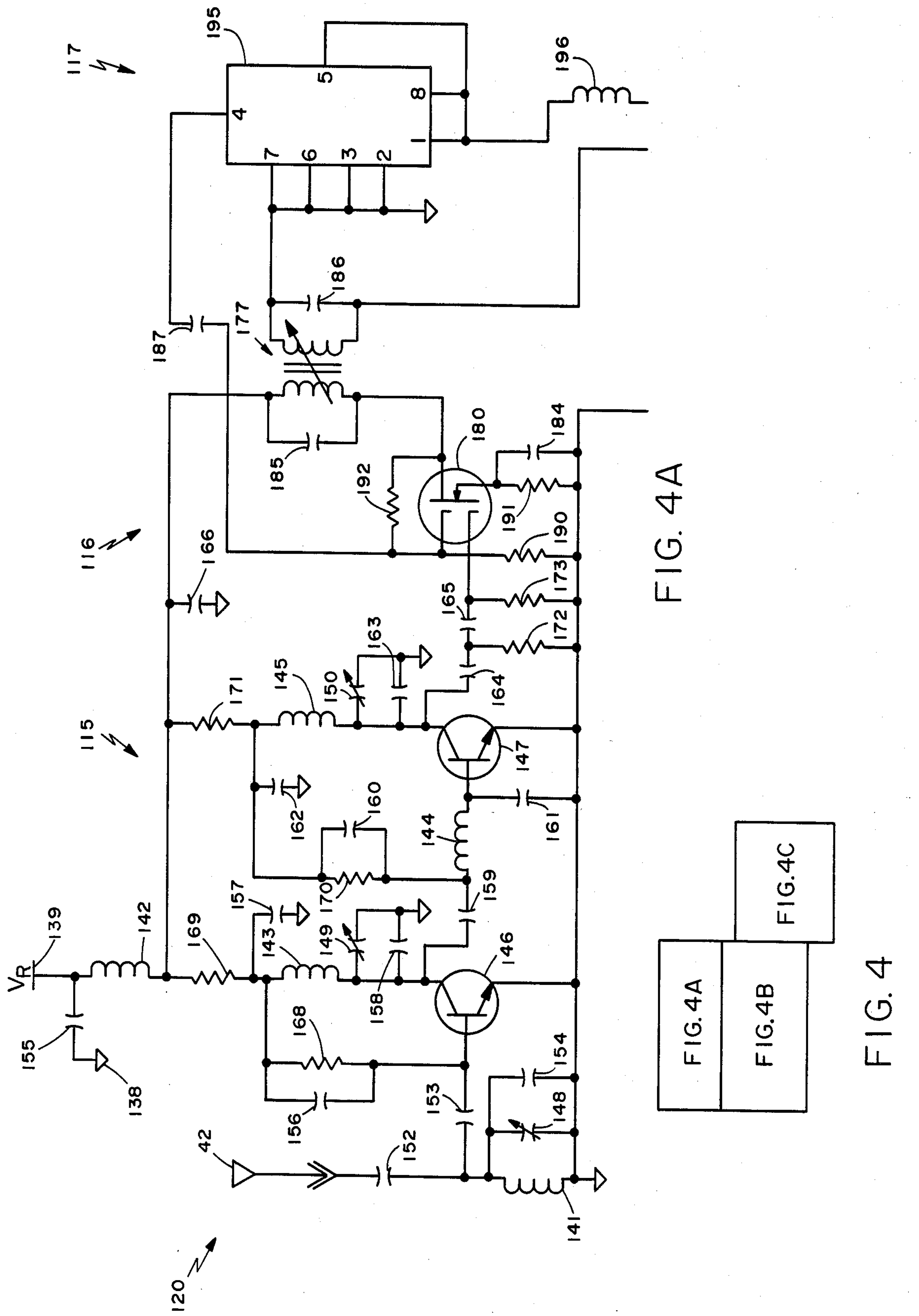
FIG. 4 shows the relationship of FIGS. 4A, 4B and 4C.
FIGS. 4A, 4B and 4C each show a portion of the detailed circuit diagram of the preferred embodiment of a receiver according to the invention.
Figure 4B:
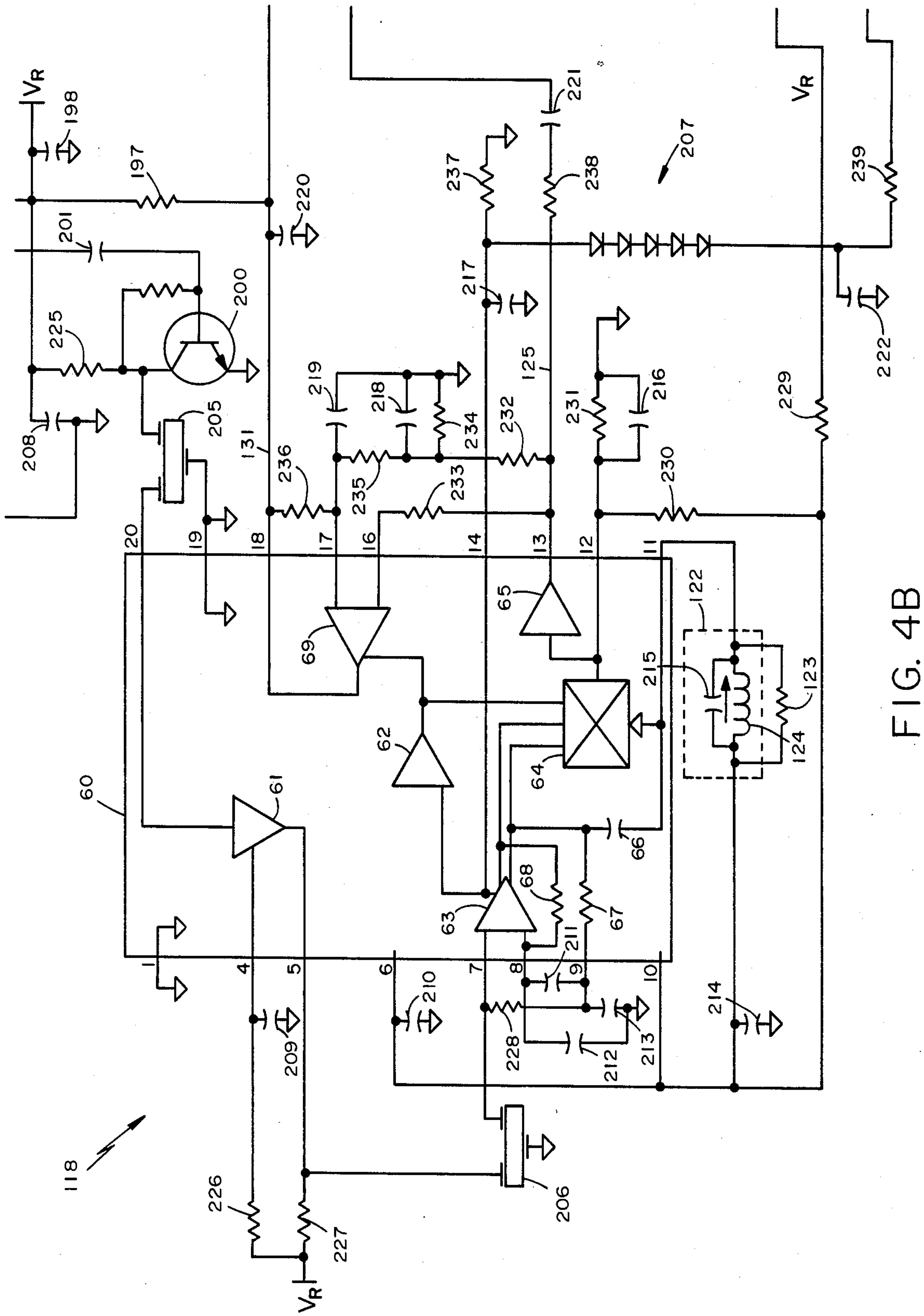
Figure 4C:
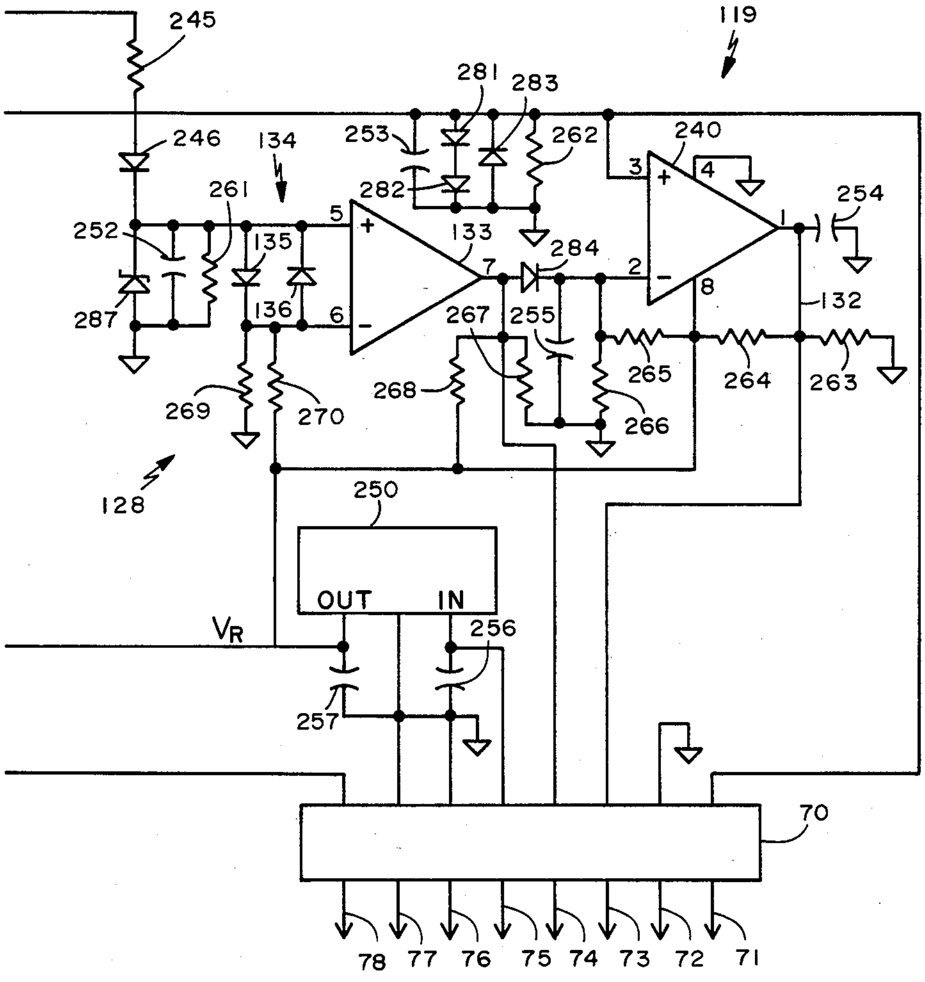

The electrical circuit of the preferred embodiment of a receiver according to the invention is shown in FIGS. 4A through 4C. If these figures are placed as shown in FIG. 4, the connections between the circuit portions will be evident. This receiver may be used as the receiver 50 in the embodiment of FIG. 2 or receiver 88 in the embodiment of FIG. 3. The circuit can be roughly divided into the following subcircuits. An RF Amplifier 115, a Mixer 116, a Local Oscillator 117, an IF Amplifier and Detector 118, and a Data Output Enable Circuit 119. These subcircuits are indicated only generally, since rf circuits resonate and function as a whole, and some components may function in more than one capacity.

The electromagnetic wave modulated by a data signal is received on antenna 42 and amplified by RF Amp 115. The received carrier wave and data signal is mixed in Mixer 116 with a lower frequency signal generated by Oscillator 117 and then sent to the Intermediate Frequency (IF) amplifier and Detector 118. A resistor 123 placed in parallel with detecting coil 124 significantly reduces the Q ratio of the detecting circuit. The detector signal is output on line 125 (output pin 13 of the IF Amp and Detector chip 60). The output of comparator 69 is low when the level of the signal on line 125 is below a predetermined level and is high when the signal is above a predetermined level. The output of comparator 69 on line 131 is applied to the Data Output Enable circuit 119 which responds to the output by passing the detector signal on line 125 to the output line 132 when the detector signal is below the predetermined level and not passing the signal on line 125 when the signal is above the predetermined level.

The output of comparator 69 on line 131 is filtered and clipped and applied to pin 5 of comparator 133. In order to maintain the fast response time of the output circuit, the filtering and clipping is limited and the signal at pin 5 of comparator 133 remains noisy. A reference signal is applied to pin 6 of comparator 133. A means 134 for enabling the reference signal to track the noisy signal comprises diodes 135 and 136. The means 134 prevents severe dips in the signal on pin 5 from tripping the comparator causing false data outputs on line 132.

Turning now to a more detailed description of the circuitry of the preferred embodiment of the receiver of invention, attention is directed to FIG. 4A. In the drawings, connections to the common ground are shown by an inverted triangle, as at 138, and connections to the positive voltage source of the system, VR, are shown as at 139. The RF amplifier 115 includes antenna 42, coils 141 through 145, transistors 146 and 147, variable capacitors 148, 149 and 150, capacitors 152 through 166, and resistors 168 through 173. Antenna 42 is connected to one side of coil 141, variable capacitor 148 and capacitors 153 and 154 through capacitor 152. The other sides of coil 141, variable capacitor 148 and capacitor 154 are connected to the common ground. The other side of capacitor 153 is connected to the base of transistor 146. The emitter of transistor 146 is connected to ground and the collector is connected to its base through coil 143 and resistor 168 and capacitor 156, the latter two in parallel. The side of coil 143 opposite transistor 146 is connected to ground through capacitor 157 and to the positive voltage source, VR, through resistor 69 and coil 142. The side of coil 142 connected to VR is also connected to ground through capacitor 155. The line between resistor 169 and coil 142 is connected to one side of the primary coil of transformer 177 in Mixer 116 and to ground through capacitor 166. The collector of transistor 146 is also connected to ground through capacitor 158 and variable capacitor 149 in parallel, and to one side of coil 144 through capacitor 159. The other side of coil 144 is connected to ground through capacitor 161 and to the base of transistor 147. The emitter of transistor 147 is connected to ground. The collector of transistor 147 is connected to ground through capacitor 163 and variable capacitor 150 in parallel and also through coil 145 and capacitor 162. The side of coil 145 opposite transistor 147 is also connected to one side of the primary coil of transformer 177 in the Mixer 116 through resistor 171, and to the side of coil 144 opposite the base of the transistor through resistor 170 and capacitor 160 in parallel. The collector of transistor 147 is also connected to gate 1 of converter 180 in Mixer 116 through capacitors 164 and 165. The line between the two capacitors is connected to ground through resistor 172, and gate 1 of converter 180 is connected to ground through resistor 173.

The Mixer 116 comprises converter 180, variable transformer (selector) 177, capacitors 184 through 187 and resistors 190 through 192. Gate 2 of converter 180 is connected to ground through resistor 190, to its drain through resistor 192, and to the number 4 pin of oscillator hybrid circuit 195 through capacitor 187. The drain is also connected to the side of the primary coil of transformer 177 opposite to the connections discussed above. The source of converter 180 is connected to ground through resistor 191 and capacitor 184 connected in parallel. Capacitor 185 is connected across the primary coil of transformer 177, while capacitor 186 is connected across the secondary coil. One side of the secondary coil is connected to ground while the other side is connected to the gate of transistor 200 in the IF Amp section (FIG. 4B) through capacitor 201.

The oscillator comprises hybrid circuit 195, and coil 196. Pins 2, 3, 6 and 7 of hybrid circuit 195 are 9rounded. Pin 5 is connected to pin 8. Pin 8 and pin 1 are connected to one side of coil 196. The other side of coil 196 is connected to the positive system voltage VR.

Turning now to FIG. 4B, the IF Amp and detector circuit is shown. This circuit includes transistor 200, integrated circuit 60, coil 124, filters 205 and 206, capacitors 198, 201, and 208 through 222, resistors 123, 197 and 224 through 239 and diodes (five) 207. The gate of transistor 200 is connected to its collector through resistor 224 and the emitter is connected to ground. The collector of transistor 200 is connected to one side of resistor 225 and to the input of filter 205. The other side of resistor 225 is connected to ground through capacitor 208, to ground through capacitor 198, and to the VR voltage. The ground terminal of filter 205 is connected to ground and the output is connected to the number 20 pin of IC 60. The number 1 and number 19 pins of IC 60 are grounded. The number 4 pin is connected to ground through capacitor 209 and to the VR voltage through resistor 226. The number 5 pin is connected to VR through resistor 227 and to the input of filter 206. The ground of filter 206 is grounded and its output is connected to pin 7 and to one side of resistor 228. The other side of resistor 228 is connected to pin 9 and to ground through capacitor 213. Pin 8 is connected to pin 9 through capacitor 211 and to ground through capacitor 212. Pin 6 of IC 60 is connected to ground through capacitors 210 and 214 in parallel, to pin 10, to the VR voltage through resistor 229, to pin 12 through resistor 230, and to one side of coil 124. The other side of coil 124 is connected to pin 11. Capacitor 215 and resistor 123 are connected across coil 124 in parallel. Pin 12 is also connected to ground through resistor 231 and capacitor 216 in parallel. Pin 13 of IC 60 is connected to pin 16 through resistor 233, to one side of resistor 232, to the non-inverting input (pin 3) of comparator 240 in the Data Output Enable circuit (FIG. 4C) through resistor 238 and capacitor 221. The other side of resistor 232 is connected to ground through resistor 234 and capacitor 218 in parallel and to pin 17 of IC 60 through resistor 235. Pin 17 of IC 60 is also connected to ground through capacitor 219 and to pin 18 through resistor 236.

Pin 18 is also connected to ground through capacitor 220, to the VR voltage through resistor 197, and to the non-inverting input of comparator 133 (FIG. 1C) through resistor 245 and diode 246, with the cathode of the diode toward the input. Pin 14 of IC 60 is connected to ground through capacitor 217 and resistor 237 in parallel, to ground through diodes 207 (five total) and capacitor 222 with the cathode of the diodes toward ground. The line between diodes 207 and capacitor 222 is connected to the Relative Signal Strength Output 78 (FIG. 4C) through resistor 239. IC 60 is preferably a Motorola MC3356 sideband FSK Receiver available from Motorola Semiconductors, P. 0. Box 20912, Phoenix, Arizona 85036 and will not be discussed in detail herein. To assist in understanding the invention, the following internal components are shown: operational amplifier 61, comparator 62, limiter 63, quadrature detector 64, buffer 65, capacitor 66, resistors 67 and 68, and noise level comparator 69. It is noted that the use of comparator 69 is different than intended by Motorola, i.e. it is used as a noise comparator rather than a data shaping comparator.

Turning now to FIG. 4C, the Data Output Enable circuit is shown. The circuit includes comparators 133 and 240, connector 70, voltage regulator 250, capacitors 252 through 257, resistors 245 and 261 through 270, diodes 135, 136, 246, and 281 through 284, and zener diode 287. The non-inverting input of comparator 133 is connected to ground through zener diode 287, capacitor 252 and resistor 261 connected in parallel with the cathode of the diode toward the input, and to the inverting input through diodes 135 and 136 connected in parallel with the direction of the diodes opposite to one another. The inverting input is also connected to ground through resistor 269 and to the VR voltage through resistor 270. The output (pin 7) of comparator 133 is connected to the inverting input of comparator 240 through diode 284 with the cathode of the diode toward the input. The output of comparator 133 is also connected to the VR voltage through resistor 268, to ground through resistor 267, and to the Carrier Detect output 74. The inverting input (pin 2) of comparator 240 is also connected to ground through capacitor 255 and resistor 266 connected in parallel and to the VR voltage through resistor 265. The number 8 pin of comparator 240 and comparator 133 is connected to the VR voltage and the number 4 pin is connected to ground. The non-inverting input (pin 3) of comparator 240 is connected to ground through resistor 262, capacitor 253, and diode 283 in parallel with the anode of the diode toward ground. Pin 3 is also connected to ground through diodes 281 and 282 in series, with the cathode of the diodes toward ground. Pin 3 of comparator 240 is also connected to the Alignment Output 71. The output (pin 1) of comparator 240 is connected to ground through capacitor 254 and to the Data Out output 73. Optionally, the output of comparator 240 may also be connected to VR through resistor 264 and to ground through resistor 63. The positive output of voltage regulator 250 provides the VR voltage and is also connected to ground through capacitor 257; the ground terminal is connected to ground and output 76; the input is connected to a 10–15 VDC source via input 75.

In the preferred embodiment of the invention, the parts of the circuits of FIGS. 3 and 4A, 4B and 4C are as follows: Microprocessor 80 is preferably an Intel 8031 microcontroller, tape deck 81 and interface 83 may be a cassette deck or any other type of tape deck with an appropriate interface to match it with the microprocessor, programming unit 85 and interface 87 may be any mini, personal, or other type computer, with appropriate interfacing, receiver 88 may be one of many such receivers in the art, while the power supply, memory, parallel outputs and inputs, serial outputs and remote functions are all devices which are well known in the art. Preferably resistors 101, 102, and 104 are lOK ohm while 103 and 105 are 4.7k ohm and 1K ohm respectively, capacitors 109 and 110 are 30 picofarads, oscillator 99 is an 8 megahertz crystal oscillator, and transistor 100 is a type VN10KM. Antenna 42 is either a whip or a remote antenna on a coaxial cable. Transistors 146, 147 and 200 are type 2SC-3302, converter 180 is a NEC 41137, selector 177 is a Cord Y5796 (MURA), local oscillator 117 is a HO-1001 hybrid circuit, filters 205 and 206 are 10.7 M hertz ceramic filters with ±200K hertz minimum bandwidth, integrated circuit 60 is a Motorola MC3356 Wideband FSK receiver, detector (including 1.5 microHenry coil 124 and 100 picofarad capacitor 215) is a KACS-K586HM, comparators 133 and 240 are on a single IC type LM 393, voltage regulator 250 is a type 78L09, zener diode 287 is a type 1N747A, diodes 207 (five total) 246, 135, 136, 281, 282 and 283 are type 1N4148, coils 141, 142, 143, 144 and 145 are (approximately) 1μH, 22μH, 4μH, 4μH, and 1μH respectively, variable capacitors 148, 149 and 150 are 2–20 picofarads, capacitors 154 and 186 are 10 picofarads, capacitors 152, 153, 156, 158, 160, 161, 163 and 164 are 3.3 picofarads, capacitors 155 and 253 are 0.001 microfarad, capacitors 166, 184, 198, 201, 208, 209, 210, 211, 212, 213, and 221 are 0.01 microfarad, capacitors 165, 218, 219, 220, 222 and 252 are 0.0047 microfarad, capacitor 185 is a 68 picofarad, capacitor 187 is a 47 picofarad, capacitor 159 is a 5 picofarad, capacitors 157, 164, 214, 256 and 257 are 0.1 microfarad, capacitor 215 is a 100 picofarad, capacitors 216, 217, 254 and 255 are 470 picofarad, resistors 168 and 190 are 68K ohm, resistor 170 is 56K ohm, resistors 169, 227, 228 and 233 are 330 ohm, resistors 172 and 191 and 120 ohm, resistors 173, 232 and 235 are 47K ohm, resistors 192 and 225 are 680 ohm, resistor 234 is 390K ohm, 236 and 265 are 1 Meg ohm, resistors 239 and 245 are lOK ohm, resistors 263, 264, 266, 267 and 268 are 4.7K ohm and resistors 171, 173, 197, 224, 226, 123, 230, 231, 237, 238, 262, 269 and 270 are 250 ohm, 47K ohm, 1.5K ohm, lOOK ohm, 180 ohm, 2.2K ohm, 15K ohm, 18K ohm, 20K ohm, 1K ohm, 470K ohm, 2K ohm and 91K ohm respectively. Connector 70 is an eight pin molex male connector.

The receiver circuit of FIGS. 4A, 4B and 4C operates as follows. Antenna 42 produces an approximately 1 microvolt signal. The RF Amp section 115 comprises an active Butterworth filter having a relatively high Q and bandpass that eliminates interference common to many receivers. This minimizes mixer products that could cause desensitization of overall receiver gain. The signal is amplified by transistors 146 and 147 as it is filtered to select a signal of 318 megahertz ±1 megahertz with other frequencies at ±1.8 megahertz attenuated by at least 20 db. Each transistor amplifies the signal by a factor of 5 or 6. The Mixer section 116 converts the signal from UHF to VHF by heterodyning the 318 megahertz signal with a 307 megahertz signal produced by oscillator 117. Selector 117 selects the 10.7 megahertz sum frequency from the converter 180. Transistor 200 amplifies the 10.7 megahertz signal. The signal is amplified further within IC 60 and filtered by ceramic filters 205 and 206 and then enters the detector circuit, the principal elements of which are quadrature detector 64 and quadrature detector tank 22. The detector circuit detects the frequency shift and separates the data signal from the 10.7 megahertz signal. Buffer 65 amplifies the data signal and isolates the detector circuitry to avoid distortion. The signal output on pin 13 of IC 60 (line 125) is noisy. When no carrier signal is being received by the receiver, the noise on line 125 is 1 volt or greater. Upon reception of a carrier signal the amplitude of the signal on line 125 dips to 0.2 to 0.3 volts. The noisy signal is the result of the wider bandwidth that is obtained by lowering the circuit Q of the detect circuitry. The level sensing circuitry 130 is designed so that the signals on pins 16 and 17 of IC 60 respond differently to the signal on line 125 and when the signal on line 125 is the noisy 1 volt or greater signal, the signal on pin 17 is greater than the signal on pin 16 and the output of comparator 69 is high (comparator on). When a message signal is received, the signal on pin 17 is less than or equal to the signal on pin 16 and the output of comparator 69 is low (comparator off). The output of comparator 69 on line 131 is rectified by diode 246 and filtered by zener diode 287, which serves as a peak filter and voltage level limiter, and capacitor 252 and resistor 261, and then applied to pin 5 of comparator 133. The filtering is kept minimal so as to maintain a response time of about 1 millisecond. Thus the signal on pin 5 remains noisy. A reference voltage is applied to pin 6 of comparator 133. When comparator 69 turns off, the signal on line 131, goes low and capacitor 252 discharges with a time constant determined by its value and the value of resistor 261. When the discharge is sufficient so that the voltage on pin 5 is equal to the reference voltage on pin 6, the comparator 133 turns off and its output (pin 7) goes low. The data signal on line 125 is applied to pin 3 of comparator 240. Resistor 238, capacitor 221, and a signal shaping circuit comprising capacitor 253, diodes 281–283 and resistor 262 cut this signal to about 0 to 0.15 volts at pin 3. The voltage at pin 2 of comparator 240 will be about 3.5 volts while comparator 133 is on, i.e. when there is no received carrier signal, which will hold the comparator 240 off. When a signal is received, the signal on pin 2 of comparator 240 drops to approximately zero, comparator 240 turns on, and the data signal input on pin 3 is output on pin 1 of comparator 240. The signal on pin 7 of comparator 133 also serves as a Carrier Detect Out signal (on output 74) which will be high when there is no carrier and low when carrier is detected. Diodes 135 and 136 permit the reference signal on pin 6 of comparator 133 to track or follow the signal on pin 5 to some degree to prevent false data outputs.

Figure 5:
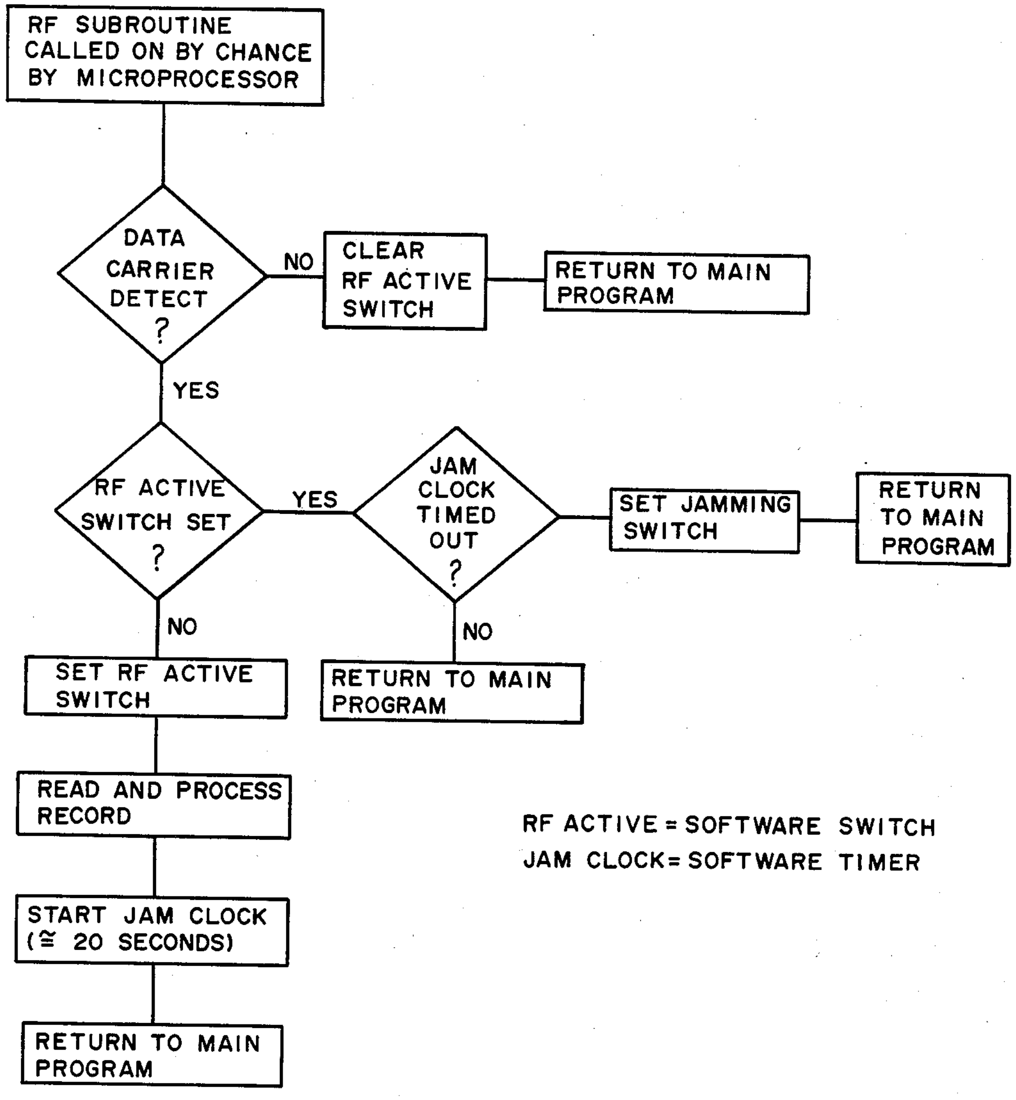
FIG. 5 shows a flow chart of the microprocessor program for detecting interference and producing a control signal for indicating that the system is being jammed.

The Carrier Detect signal on output 74 may be utilized by either the embodiment of the receiver unit of the invention in FIG. 2 or the preferred embodiment of the receiver unit shown in FIG. 3 to detect interference. The operation of the embodiment of FIG. 2 has been discussed above. In the embodiment of FIG. 3, the carrier detect signal is applied to the microprocessor 80. In this embodiment, the circuitry of FIG. 4C which produces the carrier detect signal and the microprocessor 80 comprise an interference detection means, while outputs 90 through 94 comprise an output means. Oscillator resonator 99 provides a timing signal to microprocessor 80. FIG. 5 shows the flow chart of the preferred microprocessor software program for detecting interference and producing a control signal for indicating that the system is being jammed. This subroutine is called on when the microprocessor is not performing other functions. The speed of the microprocessor and the required tasks are such that the subroutine is generally called several times each second. If the carrier detect input is low, the RF active software switch is checked and if it is not on, it is turned on; the received data is read and processed, the jam clock (a software timer) is started, and control returns to the main program. If the RF active switch is already set when the subroutine is called, then the jam clock is checked and if it has not timed out, then the control returns to the main program. If the jam clock has timed out, then the jamming switch is set which causes microprocessor 80 to activate the jamming indicator outputs, and then control is returned to the main program. If upon calling up the subroutine, there is a high signal on the output 74 of receiver 88, then the RF active switch is cleared which causes microprocessor 80 to clear the jamming indicator outputs and then control is returned to the main program. The RF active switch will remain cleared until a carrier is again detected.

Any interference or jamming of the electromagnetic transmission will cause the output 74 of the receiver to go low. The first time that the subroutine is called the false data record will be read; however, several checks for accuracy that the microprocessor applies will cause the false data to be rejected. Each subsequent time that the subroutine is called after the interference continues, the false data will not be read. This greatly reduces the chance that a false signal will slip by the accuracy checking subroutine. Further, even if the false data slips by on the first loop, on subsequent loops (which will occur within seconds), the jamming will be detected.

Preferably, a delay is programmed into the annunciation program so that alarms and other indications of sensed conditions are not sounded immediately, but only after a delay time, preferably about 30 seconds. With such a delay the jamming will be detected before the alarm is sent and the alarm may be cancelled. Even without a delay, an indication of the jamming will be given, or a jamming signal will be sent over the telephone lines 23 and 94 and the response to any alarm sounded can be adjusted. Thus, the system is able to eliminate or nearly eliminate false alarms due to interference or jamming.

In addition to avoiding false alarms, the system also provides an indication that the system is being jammed. This is preferably provided by illuminating one of the annunciator lights 20 via series outputs 93. In addition, if the remote function option 94 is selected, a jamming signal will be provided via telephone line to a remote supervisory station. Since criminals who attempt to thwart security systems may do so via jamming, such a remote indication of jamming is highly effective in avoiding this manner of breaking security systems.

The jamming signal preferably is also stored in memory unit 90 along with other data relating to the jamming, such as the date and time and length of the jamming. This data may at the same time or later be output on parallel outputs 91 or series outputs 93 which preferably include an output medium, such as a chart recorder, to make a permanent or semi-permanent record of the incidence of interference or jamming.

With reference to FIG. 4C, other outputs of receiver 88 may be utilized to provide the data by which interference is detected. For example, jamming may be defined as both a low on output 74 and a high on output 78; or alternatively a composite of a low on pin 4, a high on pin 78, and valid data on pin 71. These and various other output combinations may be used to distinguish false and actual jamming. Moreover, the inputs and programming capabilities provided via tape deck 81 and programming unit 85 permits custom jamming identification and jamming indicators to be programmed that will be most effective in dealing with the particular electromagnetic environment at a particular location. If particular jamming methods are known to be utilized by criminals in a particular location, these may be taken into consideration by the programming.

A novel security system which provides detection and indication of electromagnetic interference with the system and having numerous other features has been described. It is evident that those skilled in the art may now make different embodiments and applications of the system without departing from the inventive concepts. For example, different inputs may be provided for detection of jamming. Or other outputs may be utilized. Equivalent electronic parts and components may be used, or in some instances replaced with electromechanical or mechanical components. Accordingly, the present invention is to be construed as including each and every novel feature and novel combination of features in the security system described.

What is claimed is:

1. A security system comprising:

sensor means for sensing a condition and producing a data signal representative of the condition;

transmitter means for transmitting an electromagnetic signal modulated by said data signal;

receiver means for receiving said electromagnetic signal and providing a received data signal;

interference detection means for detecting interference with said electromagnetic signal and producing a control signal; and output means responsive to said received data signal and said control signal for providing an indication of said condition.

2. A security system as in claim 1 wherein said output means includes a means for providing an indication that interference with said electromagnetic signal is present.

3. A security system as in claim 1 wherein said interference detection means comprises a means for determining that a signal has been received by said receiver continuously for a predetermined time.

4. A security system as in claim 1 wherein said interference detection means includes a means for producing a carrier detect signal indicative that an electromagnetic wave is being received by said receiver, timing means for producing a timing signal, and a means responsive to said carrier detect signal and said timing signal for producing said control signal.

5. A security system as in claim 2 wherein said output means includes a means for indicating that said interference has occurred at a prior time.

6. A security system as in claim 5 wherein said means for indicating that said interference has occurred comprises a means for recording the time when said interference occurred.

* * * * *